(12) United States Patent
Akolkar et al.

(10) Patent No.: US 9,298,811 B2
(45) Date of Patent: Mar. 29, 2016

(54) AUTOMATED CONFIRMATION AND DISAMBIGUATION MODULES IN VOICE APPLICATIONS

(71) Applicant: INTERNATIONAL BUSINESS MACHINES CORPORATION, Armonk, NY (US)

(72) Inventors: Rahul P. Akolkar, Somers, NY (US); Jan Kleindienst, Praha-Chodov (CZ); Victor S. Moore, Boca Raton, FL (US); David Nahamoo, Yorktown Heights, NY (US); Charles F. Wiecha, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 353 days.

(21) Appl. No.: 13/942,307

(22) Filed: Jul. 15, 2013

(65) Prior Publication Data

US 2015/0019228 A1 Jan. 15, 2015

(51) Int. Cl.
*G10L 15/18* (2013.01)
*G10L 15/19* (2013.01)
*G10L 15/22* (2006.01)
*G06F 17/30* (2006.01)

(52) U.S. Cl.
CPC ...... *G06F 17/30684* (2013.01); *G10L 15/1822* (2013.01); *G10L 15/22* (2013.01); *G10L 15/19* (2013.01)

(58) Field of Classification Search
CPC ...... G10L 15/22; G10L 15/1822; G10L 15/19
See application file for complete search history.

(56) References Cited

U.S. PATENT DOCUMENTS

| | | | | |
|---|---|---|---|---|
| 7,146,383 | B2* | 12/2006 | Martin | H04M 3/4931 |
| 8,185,916 | B2* | 5/2012 | Toussaint | G06Q 10/06 |
| | | | | 719/328 |
| 2005/0131892 | A1* | 6/2005 | Knott | G06F 17/30873 |
| 2005/0165607 | A1* | 7/2005 | Di Fabbrizio | G06F 17/2785 |
| | | | | 704/256 |
| 2005/0261902 | A1* | 11/2005 | Bushey | G10L 15/1822 |
| | | | | 704/243 |
| 2006/0009973 | A1* | 1/2006 | Nguyen | G10L 15/22 |
| | | | | 704/257 |
| 2006/0143007 | A1* | 6/2006 | Koh | G10L 15/22 |
| | | | | 704/243 |

(Continued)

OTHER PUBLICATIONS http://www.mathworks.com/help/simulink/ug/modeling-control-flow-logic.html, accessed Nov. 27, 2012.

(Continued)

*Primary Examiner* — Samuel G Neway
(74) *Attorney, Agent, or Firm* — F. Chau & Associates, LLC

(57) ABSTRACT

A method for providing a voice application includes executing control flow logic modeling a dialog flow with a user via a voice browser. The control flow logic produces a disambiguation requirement. A disambiguation module is initiated and a set of at least two candidates and partitioning criteria is sent from the control flow logic to the module. Attributes of the candidates are analyzed to determine a partitioning score for each attribute indicative of ability to distinguish between candidates based on the partitioning criteria. The attributes are sorted based on the partitioning scores. The user is queried based on a top-sorted attribute and results of the query are used to reduce the set of candidates. The steps of analyzing, sorting, and querying are repeated until the set of candidates is reduced to a single candidate. The single candidate is returned to the control flow logic for continued execution.

20 Claims, 6 Drawing Sheets

(56) References Cited

U.S. PATENT DOCUMENTS

| | | | |
|---|---|---|---|
| 2008/0187121 A1* | 8/2008 | Agarwal | H04M 3/4931 379/218.01 |
| 2008/0208590 A1* | 8/2008 | Cross | G10L 15/22 704/275 |
| 2009/0037175 A1* | 2/2009 | Wang | G10L 15/1822 704/251 |
| 2010/0042414 A1* | 2/2010 | Lewis | G10L 15/08 704/270.1 |
| 2012/0209594 A1 | 8/2012 | Agarwal et al. | |
| 2015/0019228 A1* | 1/2015 | Akolkar | G10L 15/22 704/270.1 |

OTHER PUBLICATIONS ftp://ftp.software.ibm.com/software/pervasive/info/WSVoiceToolkit.pdf, accessed Nov. 27, 2012 IBM Corporation, Published Jun. 2004.

www.omg.org/bpmn/Documents/6AD5D16960.BPMN_and_BPM.pdf, accessed Nov. 27, 2012 Published, 2003.

* cited by examiner

AUTOMATED CONFIRMATION AND DISAMBIGUATION MODULES IN VOICE APPLICATIONS

BACKGROUND

1. Technical Field

The present disclosure relates to voice applications and, more specifically, to systems and methods for automated confirmation and disambiguation modules in voice applications.

2. Discussion of Related Art

Voice applications are computer programs that communicate with a user by spoken language. For example, a user may be provided with voice prompts and may then speak instructions that are interpreted by the voice application. Voice applications find a wide variety of uses such as automated telephone-based customer service applications. Voice applications may be developed using existing standards such as VoiceXML (VXML), which is a standard for providing automated interactive voice dialogue. VoiceXML may be used in a manner similar to how HTML documents may be viewed on a web browser; VoiceXML documents may interpreted by a voice browser. A user may be in contact with the voice browser via a telephone system. However, the voice browser may also be local to the user. For example, a voice browser installed on a smartphone or tablet computer may be used to interact with a user.

In addition to VoiceXML, voice applications may be modeled using business process modeling notation (BPMN). BPMN establishes standards for modeling business process and web services. As voice applications may be an important part of web services, BPMN may be particularly useful in modeling voice applications.

An important part of voice applications is automated speech recognition (ASR). ASR techniques are used to interpret received user speech into computer-understandable instructions. As there may be many different ways to express the same instruction in spoken language, many different pronunciations for the same word, and many different words that sound very similar, if not identical to each other, ASR techniques may have difficulty in distinguishing between multiple possible options for what a user may have said. Confirmation and disambiguation are approaches to help ASR techniques in pinning down spoken words to particular commands after the computer has determined that the spoken words may be one of a number of different commands.

In confirmation, the voice application may ask the user to confirm that a particular command was actually spoken. A typical confirmation question may sound like, "I think you said X, is that correct?" Confirmation may be well suited for cases in which the computer has determined that spoken language is most likely a particular command but certainty does not exceed a predetermined threshold and/or there may be other close options available.

In disambiguation, the computer may have trouble distinguishing between two or more possible options and the computer may request the user to select between the possible options. Disambiguation may be particularly useful where multiple options sound similar and thus disambiguation may ask the user to select between the similar sounding options, for example, by prompting the user to answer using language that is easier to interpret. For example, where the user has spoken the name of a city and the computer is not sure if the city name is "Austin" or "Boston," disambiguation may be performed by asking the user, "Did you say Austin, Tex. or Boston, Mass.?" thereby prompting the user to say the name of the state along with the city so that the computer may accurately determine the command.

Where there is a large number of potential commands, disambiguation may serve to reduce the field of potential commands and ultimately arrive at a particular command through the course of a set of questions. In this case, questions may be carefully determined based on a range of expected answers.

As expected answers generally have a lot to do with the potential commands, confirmation and disambiguation logic is generally programmed on an application-by-application basis. In particular, the logic for performing confirmation and disambiguation, along with the possible answers, is generally hardcoded directly into the process flow for the voice application. By utilizing this approach, knowledge of expected answers may more effectively be used to perform confirmation and disambiguation. However, this approach also makes programming voice applications more difficult by forcing developers to repeatedly program confirmation and disambiguation.

BRIEF SUMMARY

A method for providing a voice application includes executing control flow logic modeling a dialog flow with a user via a voice browser. The control flow logic produces a disambiguation/confirmation requirement. A disambiguation/confirmation module is initiated in response to the disambiguation/confirmation requirement. A set of at least two candidates and partitioning criteria is sent from the control flow logic to the disambiguation/confirmation module. Attributes of the set of candidates are analyzed to determine a partitioning score for each attribute indicative of that attribute's ability to distinguish between the at least two candidates based on the partitioning criteria. The attributes are sorted based on their corresponding partitioning scores. The user is queried based on a top-sorted attribute and results of the query are used to at least reduce the set of candidates. The steps of analyzing, sorting, and querying are repeated until the set of candidates is reduced to a single candidate. The single candidate is returned from the disambiguation/confirmation module to the control flow logic for continued execution.

The control flow logic may incorporate business process modeling (BPM).

The disambiguation/confirmation requirement may be generated by the control flow logic when a degree of certainty in a top candidate of the set of candidates is below a first predetermined threshold or a difference between the degree of certainty in the top candidate and another candidate of the set of candidates is below a second predetermined threshold.

The steps of analyzing and sorting attributes may include collecting identifiers from each candidate of the set of candidates pertaining to each attribute and sorting the attributes according to linguistic or phonemic characteristics.

A linguistic or phoneme database may be accessed to provide the linguistic or phonemic characteristics.

Querying the user may include generating a disambiguation user interface based on the top-sorted attribute with reference to one or more user interface documents, providing the generated disambiguation user interface to the user via a text-to-speech module, obtaining a user response via an automatic speech recognition module, and reducing the set of candidates based on the obtained user response.

The partitioning score may be a coefficient having a value of between 0.0 and 1.0.

A method for providing a voice application includes executing control flow logic modeling a dialog flow with a user via a voice browser, the control flow logic producing a disambiguation/confirmation requirement. A disambiguation/confirmation module is initiated in response to the disambiguation/confirmation requirement. A candidate and selection criteria are sent from the control flow logic to the disambiguation/confirmation module. Attributes of the candidate are analyzed to determine a confirmation score for each attribute indicative of that attribute's ability to confirm the correctness of the candidate based on the selection criteria. The attributes are sorted based on their corresponding partitioning scores. The user is queried based on a top-sorted attribute and results of the query are used to modify a measure of certainty in the correctness of the candidate. The measure of certainty in the correctness of the candidate is returned to the control flow logic for continued execution.

The steps of analyzing, sorting, and querying may be repeated until the measure of certainty is either above a first predetermined threshold or below a second predetermined threshold.

When the candidate is modified to be below the second predetermined level of certainty, additional candidates may be received from the control flow logic and disambiguation may be performed on the additional candidates.

The control flow logic may incorporate business process modeling (BPM).

The disambiguation/confirmation requirement may be generated by the control flow logic when the measure of certainty in the candidate is below a predetermined threshold.

The steps of analyzing and sorting attributes may include collecting identifiers from the candidate pertaining to each attribute and sorting the attributes according to linguistic or phonemic characteristics.

A linguistic or phoneme database may be accessed to provide the linguistic or phonemic characteristics.

Querying the user may include generating a confirmation user interface based on the top-sorted attribute with reference to one or more user interface documents, providing the generated confirmation user interface to the user via a text-to-speech module, obtaining a user response via an automatic speech recognition module, and modifying the measure of certainty based on the obtained user response.

A method for providing a voice application includes executing control flow logic modeling a dialog flow with a user via a voice browser. The control flow logic produces a disambiguation/confirmation requirement. A database disambiguation module is initiated in response to the disambiguation/confirmation requirement. A set of at least two candidates and partitioning criteria are sent from the control flow logic to the database disambiguation module. A set of attributes is retrieved for each candidate of the set from a database. The attributes of each candidate of the set of candidates is analyzed to determine a partitioning score for each attribute indicative of that attribute's ability to distinguish between the at least two candidates based on the partitioning criteria. The attributes are sorted based on their corresponding partitioning scores. The user is queried based on a top-sorted attribute and results of the query are used to at least reduce the set of candidates. The steps of analyzing, sorting, and querying are repeated until the set of candidates is reduced to a single candidate. The single candidate is returned from the database disambiguation module to the control flow logic for continued execution.

The control flow logic may incorporate business process modeling (BPM).

The disambiguation/confirmation requirement may be generated by the control flow logic when a degree of certainty in a top candidate of the set of candidates is below a first predetermined threshold or a difference between the degree of certainty in the top candidate and another candidate of the set of candidates is below a second predetermined threshold.

The steps of analyzing and sorting attributes may include collecting identifiers from each candidate of the set of candidates pertaining to each attribute and sorting the attributes according to linguistic or phonemic characteristics.

Querying the user may include generating a disambiguation user interface based on the top-sorted attribute with reference to one or more user interface documents, providing the generated disambiguation user interface to the user via a text-to-speech module, obtaining a user response via an automatic speech recognition module, and reducing the set of candidates based on the obtained user response.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
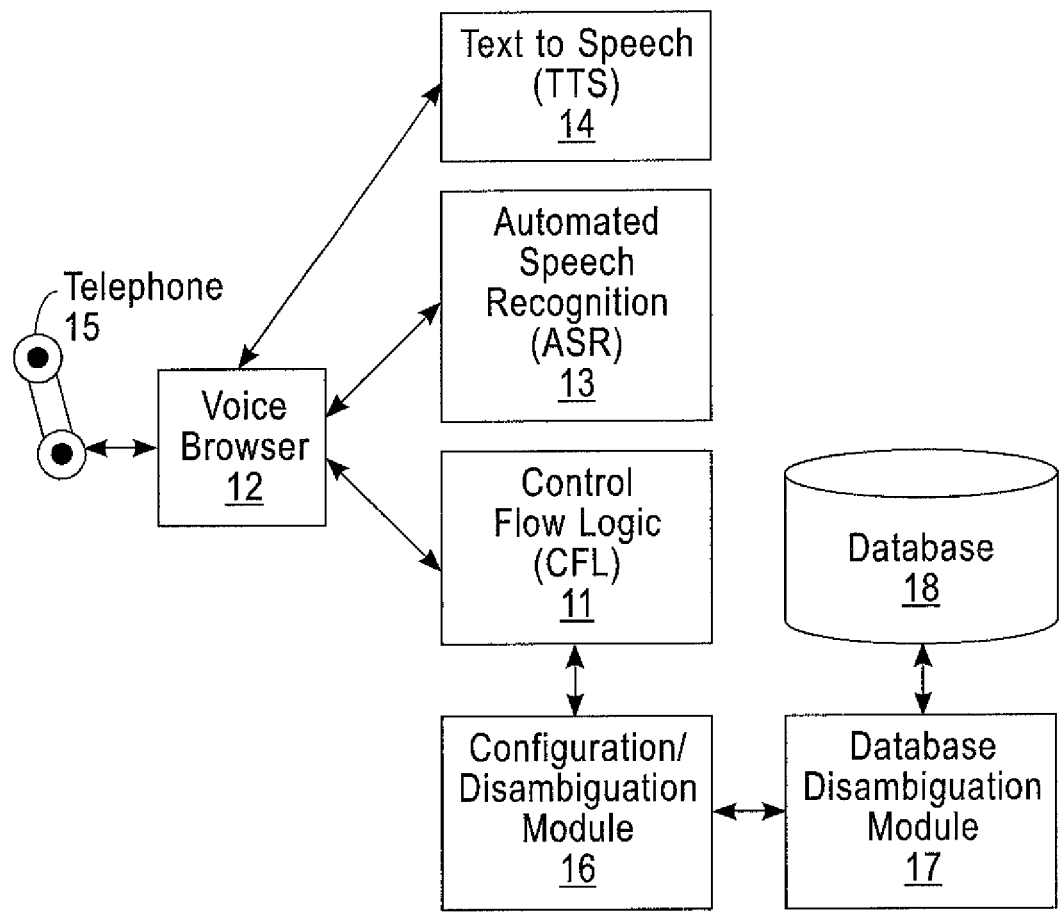
FIG. 1 is a schematic diagram illustrating an architecture for performing automated confirmation and disambiguation in voice applications in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention may provide for systems and methods for performing confirmation and disambiguation in voice applications using generalized modules that may be used in place of hardcoding confirmation and disambiguation into the control flow logic. This generalize module may be referred to herein as the automated speech recognition (ASR) confirmation/disambiguation module.

As discussed above, existing approaches to voice applications require that confirmation and disambiguation be custom programmed based on expected answers in order to provide a satisfactory user experience. In contrast, exemplary embodiments of the present invention provide generalized modules that may be used to perform confirmation and disambiguation without the need for custom programming.

Exemplary embodiments of the present invention may provide an ASR confirmation/disambiguation module capable of solving confirmation and disambiguation problems. This module may be activated as needed and may dynamically and automatically generate prompts for performing confirmation and disambiguation with the user.

The ASR confirmation/disambiguation module may be utilized in voice applications built upon a business process modeling (BPM) framework, however, the invention is not limited to such an application and while use with BPM may be described herein for the purposes of providing a simplified explanation, it is to be understood that the concepts of an automated confirmation and disambiguation module as herein described may be used in a wide variety of platforms.

Additionally, exemplary embodiments of the present invention may be used when the voice application uses the user response to retrieve data from an external database. If the application expects a unique entry to be picked from the database but the user provides only partial information, e.g. information insufficient to identify the unique response, the data retrieved from the database might be ambiguous. For example if the user, upon being prompted for a city name, provides the name of a city that exists in multiple states, as determined by the database, the application needs to disambiguate. Exemplary embodiments of the present invention therefore provide a database (DB) disambiguation module solving the ambiguity in data retrieved from the external resource that automatically recognizes the problem and generates the appropriate prompts.

Both modules solving these ASR and DB disambiguation problems may be automated, generating the necessary prompts and grammars for the user. These modules may be integrated in relevant steps of the dialog and automatically activated when ambiguity occurs. These modules may be integrated into voice applications with perhaps only minimal custom coding.

Exemplary embodiments of the present invention may utilize a server component called the control flow logic (CFL) that arranges communication between BPM activities that model the dialog flow and VXML browser with an ASR engine that interprets user vocal commands and a text-to-speech (TTS) engine that provides vocal prompts and communicates other information to the user through a synthesized and/or prerecorded voice.

The control flow logic may include the ASR confirmation/disambiguation module. This confirmation/disambiguation module may accept as input, N-best results of the voice recognition (where N is an integer of two or more), and decide whether the response is sufficiently enough or if additional confirmation or disambiguation is necessary. Confirmation may be automatically invoked when the confidence level of the best-recognized result is below a predetermined threshold value. Disambiguation may be automatically invoked when there are other recognized results with high confidences besides the top result.

When asking for confirmation, the ASR confirmation/disambiguation module may produce a question such as, "Did you really mean X?" When disambiguating, the module may generate a prompt for the disambiguation based on the possible options. For example, the module may produce a question such as, "Please say 1 for X, 2 for Y, or 3 for Z." In both cases the prompt with the specific grammar attached is provided to the VXML browser. The VXML browser, which is responsible for reading prompts to the user (for example, using TTS) and transcribing audible responses (for example, using ASR), may handle the asking of the questions to the user. The process may be automated and hidden from a main dialog flow. The main dialog flow may therefore not have to take into account if some ASR confirmation or disambiguation ever happened. The main dialog flow may therefore simply be certain that the final user response received from the CFL is the confirmed one. The activity in the main dialog flow might therefore only provide a confidence level to be used by the module if the default value is not suitable.

The database (DB) disambiguation module may be present in the BPM level of the architecture. When the dialog flow process uses the user response to query external data storage, an ambiguity can occur. If the user response appears to match multiple entries from within the database (for example, a city name is provided that matches multiple different cities with the database), the module may be invoked to perform disambiguation based on the DB entries returned from the query. Therefore this module may be placed after a connection to an external data storage where the ambiguous data can be retrieved.

The disambiguation may be automatically invoked when the returned result of the query is not unique. The module may use data in different DB entries of the result to retrieve the additional information for distinguishing the candidates. The database entries that are used to disambiguate may be provided as parameters by the developer of the application that utilizes the modules or the database entries can be dynamically generated by the DB disambiguation module based on the candidates. In this case the module selects the database entries that are most suitable for the disambiguation, for example, the module may determine which database entries are most effective for distinguishing between candidates. The phonetic similarities between candidates may be taken into account. Based on the selected candidates, the module may generate the prompt for the disambiguation using the database entries that are most suitable. If the list of candidates is short enough, the prompt may enumerate each of them and let the user pick by number or other such means. If there are many candidates, the module may generate a prompt asking the user for information that may be used either to decide upon the final result or to otherwise narrow the field of possible candidates. For example, the generated prompt may be the following: "Please specify the state." The prompt and its grammar can be generated based on the database entry name and the data of the candidates. The generated prompts may be as close as possible to a natural language considering the candidates, the database entries used, and their data.

FIG. 1 is a schematic diagram illustrating an architecture for performing automated confirmation and disambiguation in voice applications in accordance with exemplary embodiments of the present invention. Control flow logic (CFL) 11 may be programmed, for example, by a developer, to provide the flow tree of the voice application. The flow tree may guide the progression of the voice application from start to finish, while taking into account all of the various ways in which the voice application may branch depending upon user input. While CFL of some approaches in the related art may be hard-coded to include confirmation and disambiguation based on expected results, the CFL in accordance with exemplary embodiments of the present invention does not contain logic for confirmation and disambiguation. Thus, the programming of the CFL may be significantly simplified and may be less mundane.

The CFL 11 may provide instructions to a voice browser 12 for guiding the voice browser 12 to interact with a user. The voice browser 12 may utilize a text to speech (TTS) module 14 to provide the vocalized prompts. The voice browser may then supply the voice prompts to the user via a telephone 15 or another speaker and microphone interface. The user may respond to the voice prompts via the telephone 15 and the voice browser may utilize the ASR module 13 to provide dictation for the vocal input. The dictated response may be presented back to the control flow logic. However, the confirmation/disambiguation module 16 may be automatically invoked when the dictated response is not satisfactorily definitive. Moreover, when the dictated response is understood to be an entry in a database 18, and the dictated response is not satisfactorily definitive, the database disambiguation module 17 may read the pertinent entries from the database 18 and may perform disambiguation therefrom. In either event, a confirmed and/or disambiguous response may be provided back to the CFL 11.

Figure 2:
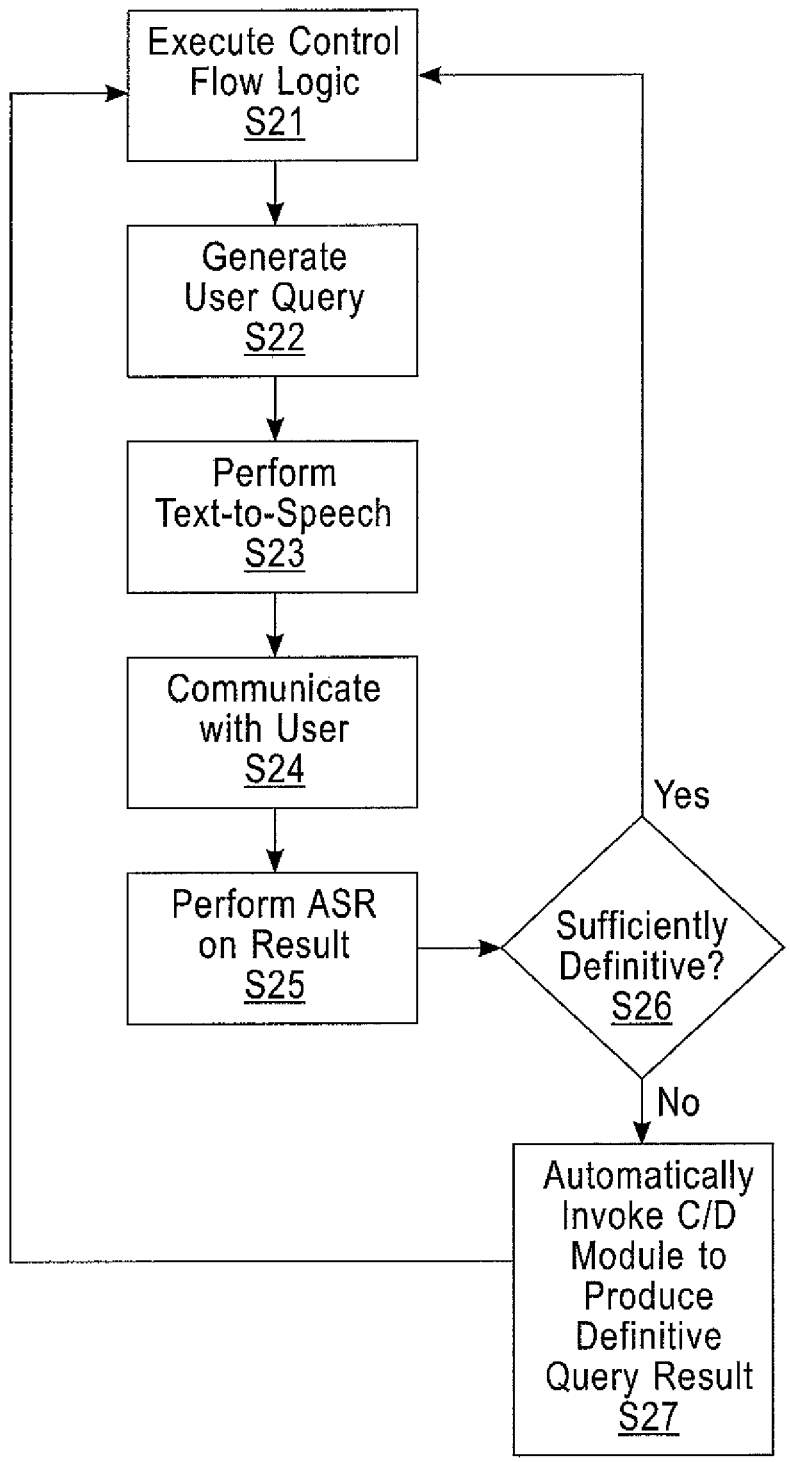
FIG. 2 is a flow chart illustrating an approach for performing automated confirmation and disambiguation in voice applications in accordance with exemplary embodiments of the present invention.

FIG. 2 is a flow chart illustrating an approach for performing automated confirmation and disambiguation in voice applications in accordance with exemplary embodiments of the present invention. The control flow logic may be executed (Step S21). Execution of the control flow logic may involve running the application programming of the voice application. The CFL may be executed on an application server, which may include a BPM framework.

The CFL may call for the generation of a user queries (Step S22), for example, when input is required. Text-to-speech may be utilized to vocalize the query (Step S23). Voice communication may then be performed (Step S24). Voice communication may include playing the vocalized query to the user and digitizing an audible response of the user. ASR may then be performed on the digitized response (Step S25).

It may then be determined whether the digitized response is sufficiently definitive (Step S26). A definitive result may be a result that is identified as a single response with an acceptable level of certainty. The acceptable level of certainty may be provided by the CFL as a parameter. If it is determined that the response is sufficiently definitive (Yes, Step S26), then the response may be used and execution of the control flow logic may continue (Step S21). If it is determined that the response is not sufficiently definitive (No, Step S26), for example, there are multiple response candidates and/or there is an insufficient level of certainty for a leading candidate, then the confirmation and disambiguation module may be invoked to produce a definitive query result (Step S27), which may be a single identified result with a sufficient level of certainty. Thereafter the response may be used and execution of the control flow logic may continue (Step S21).

Figure 3:
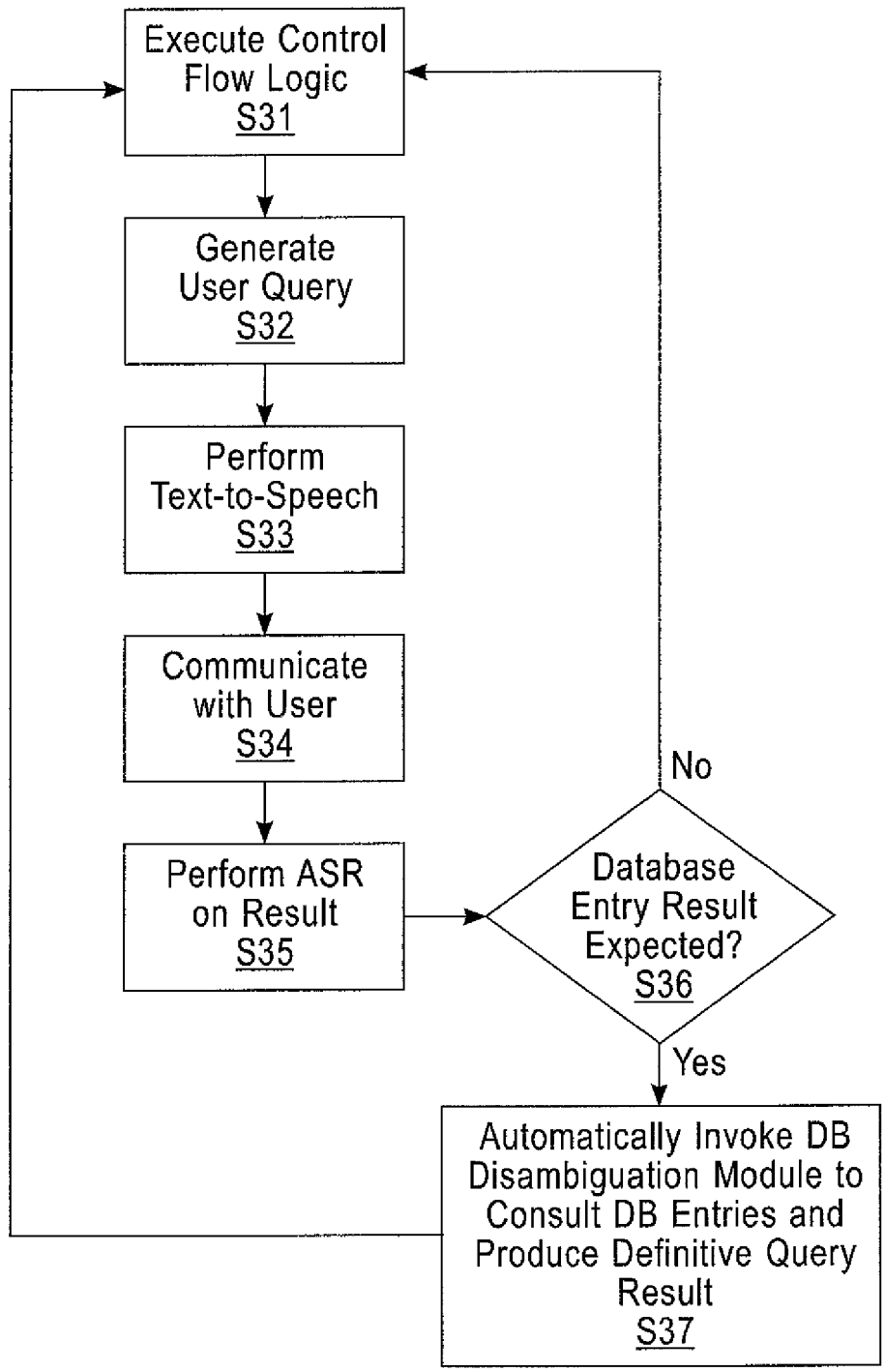
FIG. 3 is a flow chart illustrating an approach for performing automated database disambiguation in voice applications in accordance with exemplary embodiments of the present invention.

The approach discussed above may be particularly useful when general ASR results are not sufficiently definitive. However, sometimes the CFL expects a result to be among a set of expected answers that may be retrieved from a database. For example, an airline's voice application for providing flight status may query the user for a destination city and it is expected that the result provided by the user is one of the cities served by the airline. In this case, the results may be compared against database entries. FIG. 3 is a flow chart illustrating an approach for performing automated database disambiguation in voice applications in accordance with exemplary embodiments of the present invention.

The control flow logic may be executed (Step S31). The CFL may call for the generation of a user queries (Step S32), for example, when input is required. Text-to-speech may be utilized to vocalize the query (Step S33). Voice communication may then be performed (Step S34). Voice communication may include playing the vocalized query to the user and digitizing an audible response of the user. ASR may then be performed on the digitized response (Step S35).

It may then be determined whether the digitized response is expected to match an entry from a database (Step S36). This determination may be made, for example, from a parameter provided by the CFL. In the example above, where the result being solicited is a city an airline flies to; the programming of the CFL may indicate that the results are to be a selection from among a set of database entries. This indication may be provided by the CFL as a parameter. If the response is not expected to match a database entry (No, Step S36), then the response may be used and execution of the control flow logic may continue (Step S31). If, however, it is determined that the results are to be selected from among a set of database entries (Yes, Step S36), then the database disambiguation module may be automatically invoked to consult database entries and produce definitive query results (Step S37). Thereafter the response may be used and execution of the control flow logic may continue (Step S31).

Figure 4:
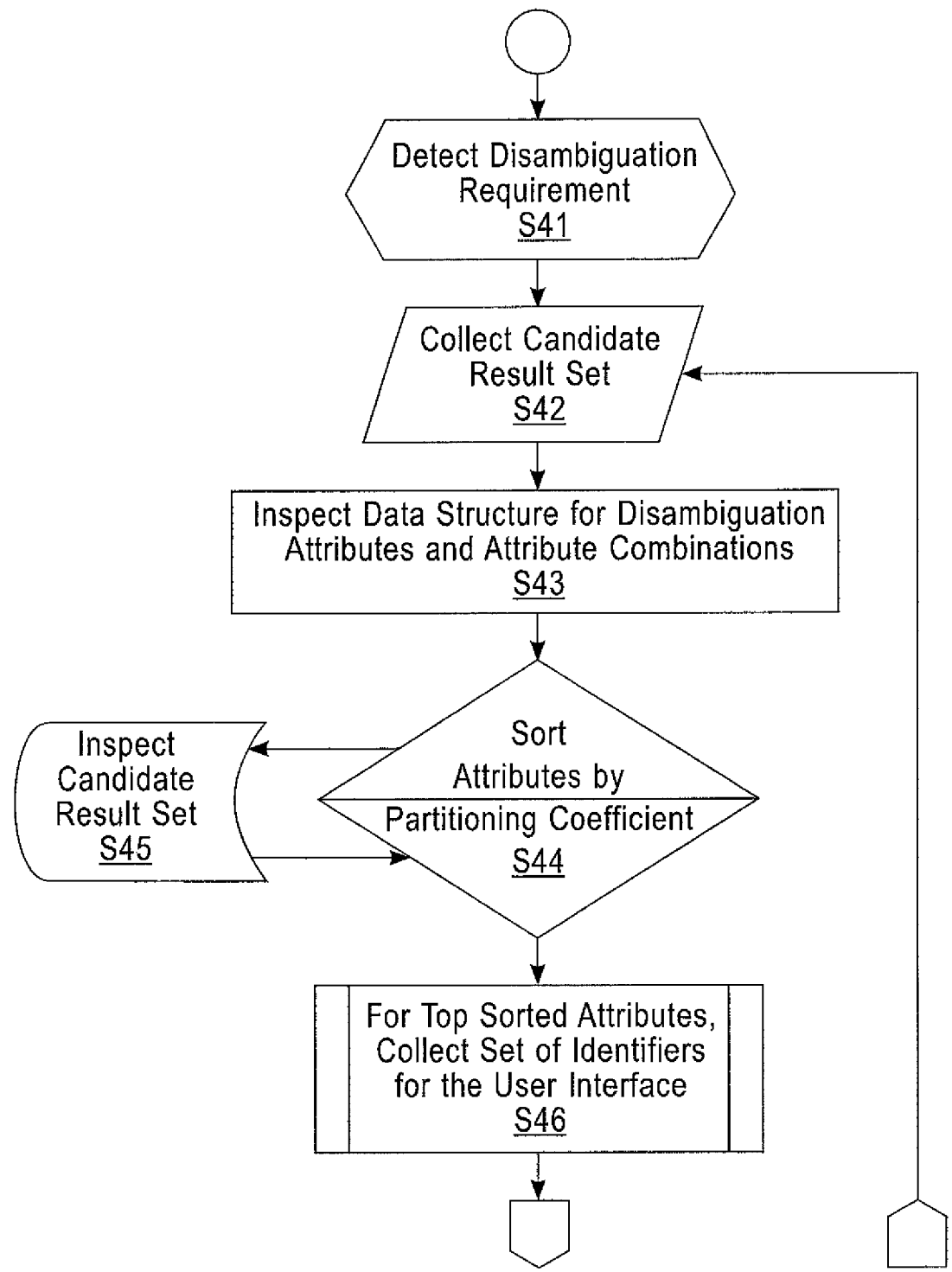
FIGS. 4 and 5 provide a flow chart illustrating the logic of the confirmation/disambiguation modules in accordance with exemplary embodiments of the present invention.
Figure 5:
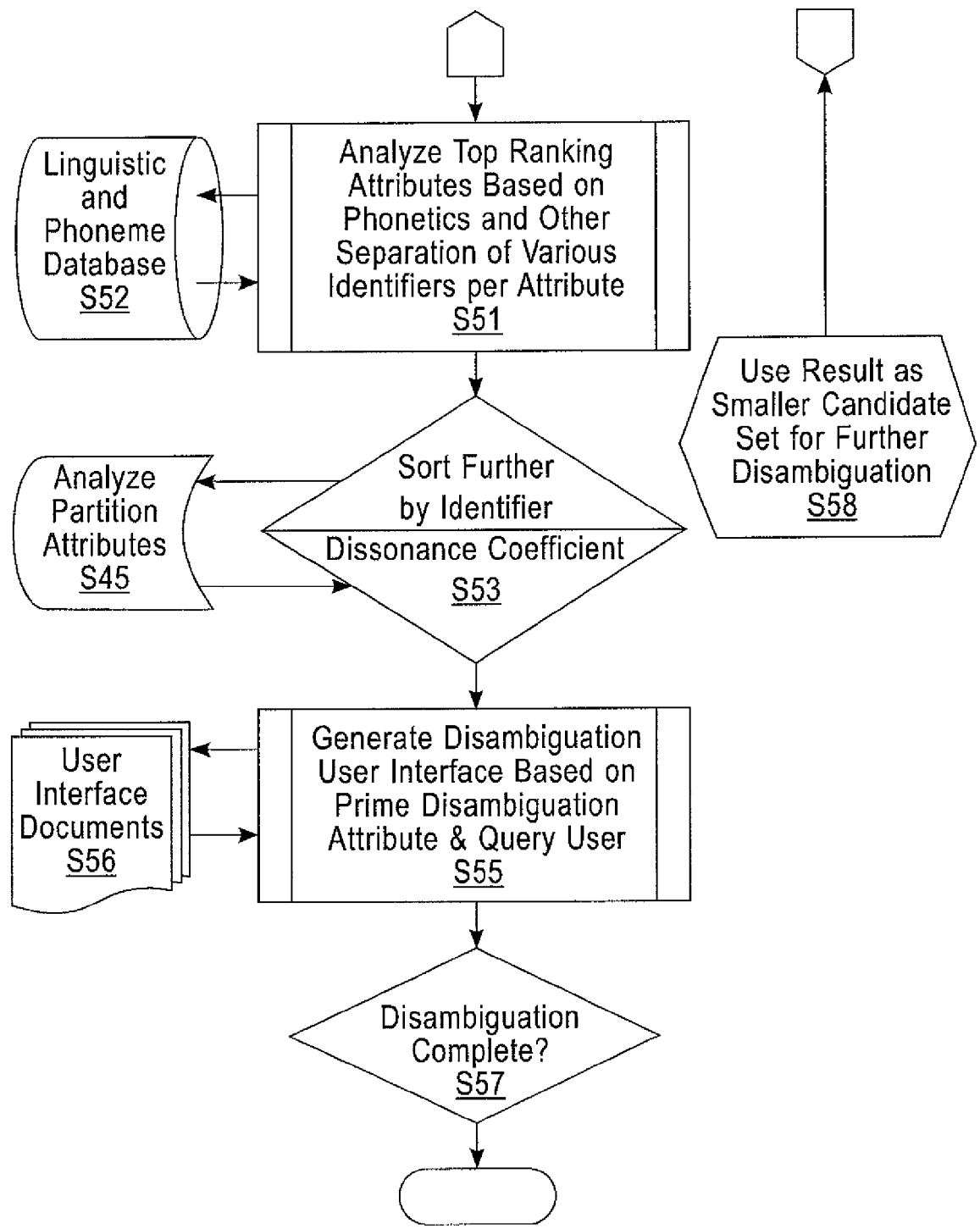

As discussed above, by automatically invoking confirmation/disambiguation modules, exemplary embodiments of the present invention remove the need for hardcoding these features into the CFL. FIGS. 4 and 5 provide a flow chart illustrating the logic of the confirmation/disambiguation modules in accordance with exemplary embodiments of the present invention. The process may begin when a disambiguation request is detected (Step S41). The disambiguation request may be automatically generated by the voice application CFL. Examples of a disambiguation request may include a set of N-best candidates, where N is an integer of at least two. The N-best candidates may have similar confidence values and disambiguation may be desirable for this reason. Alternatively, the disambiguation may be initiated by a CFL flag, where the developer of the voice application expects the set of answers to be somewhat ambiguous. Next, data pertaining to the candidate result set may be collected (Step S42). The candidate result set may be a group of words or phrases that the user, in making a selection, may have said. These words may be similar sounding or even identical sounding and thus disambiguation would be needed. The data structure of the candidates may be inspected to obtain disambiguation attributes and/or attribute combinations (Step S43). Attributes, as used herein, are the categories of data used, for example, to describe each database entry. Disambiguation attributes are those categories of data that may be used to distinguish the candidates from each other. For example, where the set of candidates are people's names and each person has an associated database entry, disambiguation may use, where the first name and last name of the people sound at least similar, other attributes than first name and last name, such as "location" or "date of birth." Where the candidates have at least a slightly different pronunciation, attributes may be phonetic, such as "first name." However, attributes may also relate to other characteristics of the candidates such as those pertaining to their definitions. Similarly, combinations of attributes may be used where particular combinations may have special significance. Inspection may therefore include determining which attributes/combinations may be used to disambiguate.

Each attribute/combination may have a partitioning coefficient indicative of that attribute/combination's ability to distinguish the candidates. For example, the larger the partitioning coefficient, the better the attribute/combination may be at distinguishing between more candidates.

The attributes/combinations may thereafter be sorted by partitioning coefficient (Step S44). The partitioning coefficient may be a value representing the partitioning power of each attribute/combination. This value may be normalized from between 0.0 meaning that the attributes have only limited ability to distinguish and 1.0 meaning that the attributes are capable of effectively distinguishing between all candidates.

This sorting may involve an inspection of the candidate result set (Step S45). Thereafter, for top sorted attributes, a set of identifiers may be collected for use by a user interface (Step S46). Top sorted attributes may be those attribute or attribute combinations that have the greatest partitioning power. Identifiers are those data points that are associated with each candidate for each attribute. For example, if the attribute is "first name" then the identifier for one candidate may be "John" while the identifier for another candidate, for the same attribute, may be "Betty." Accordingly, in this step, the actual data may be collected pertaining to the values of each of the top sorted attributes for each candidate.

Then, the top ranked attributes may be analyzed based on phonetic and other separation of various identifiers per attribute (Step S51). This step may serve to determine which attributes may be best suited for disambiguation in part based on the degree to which the associated identifiers may be pronounced. A linguistic and/or phoneme database may be consulted (Step S52) to provide insight on the way in which various identifiers for the top attributes may be pronounced.

Thereafter, further sorting of the attributes may be performed based on a degree to which pronunciation of the identifiers may differ (Step S53). This degree of difference may be expressed, for example, as an identifier dissonance coefficient. This may also be a normalized value between 0.0 where identifiers may be pronounced substantially identically and 1.0 where each identifier may have an identifiably different pronunciation. The object of the further sorting may be to minimize the number of minimal pairs (phoneme separation) and to increase the odds for complete disambiguation. This further sorting may reference analyzed partitioning attributes (Step S54). The analyzed partitioning attributes may be the result of the analysis of Step SM.

Thereafter, a disambiguation user interface may be generated based on prime disambiguation attributes and then the user may be queries using the generated user interface (Step S55). Generating the disambiguation user interface may include determining the best syntax for presenting a query to the user that references the top sorted attribute(s). The disambiguation user interface may depend on such factors as type and number of identifiers. Suitable techniques for generating the disambiguation user interface may include enumeration, large list segmentation, and other forms of grammar generation. The prime disambiguation attribute may be selected by the CFL as the disambiguation criteria. In generating the disambiguation user interface, various user interface documents may be consulted (Step S56). These interface documents may be selected according to what is most appropriate for the given voice application being developed. Examples of suitable interface documents may include HTML5 documents for supporting a primarily visual interface, VoiceXML documents for supporting a voice browser, etc.

It may thereafter be determined whether disambiguation is complete (Step S57). Completion of the disambiguation may be defined as the ruling out of all but one candidate. If the disambiguation is complete (Yes, Step S57) then the disambiguation process may end and the final result may be provided back to the CFL. On the other hand, if the field of candidates has been narrowed but is not yet narrowed down to one (No, Step S57), then the result of the disambiguation, which may be a smaller set of candidates, may be used (Step S58) for further disambiguation (Step S42).

Figure 6:
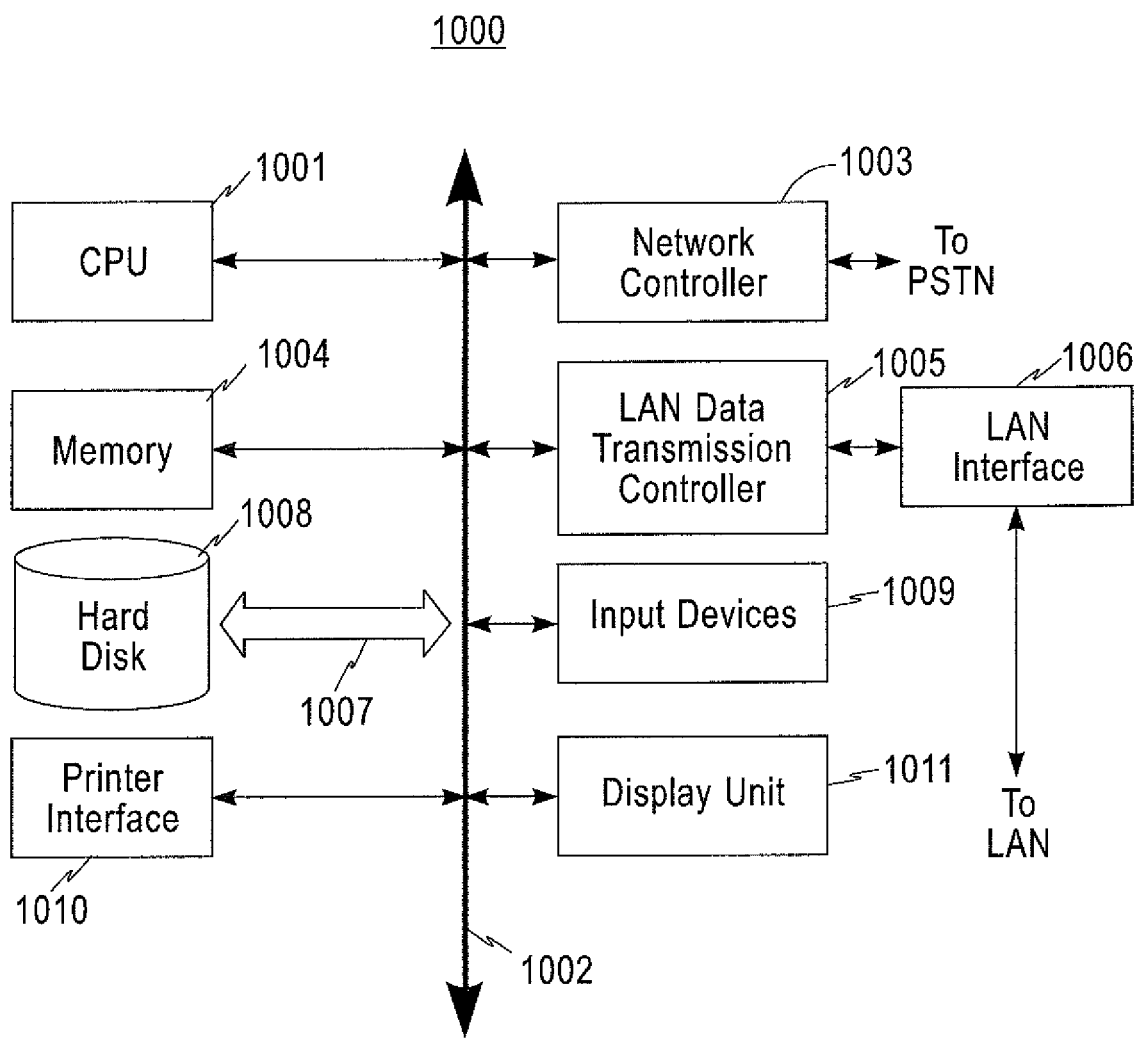
FIG. 6 shows an example of a computer system capable of implementing the method and apparatus according to embodiments of the present disclosure.

FIG. 6 shows an example of a computer system which may implement a method and system of the present disclosure.

The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for providing a voice application, comprising:
executing control flow logic modeling a dialog flow with a user via a voice browser, the control flow logic producing a disambiguation/confirmation requirement;
initiating a disambiguation/confirmation module in response to the disambiguation/confirmation requirement;
sending a set of at least two candidates and partitioning criteria from the control flow logic to the disambiguation/confirmation module;
analyzing attributes of the set of candidates to determine a partitioning score for each attribute indicative of that attribute's ability to distinguish between the at least two candidates based on the partitioning criteria;
sorting the attributes based on their corresponding partitioning scores;
querying the user based on a top-sorted attribute and using results of the query to at least reduce the set of candidates;
repeating the steps of analyzing, sorting, and querying until the set of candidates is reduced to a single candidate; and
returning the single candidate from the disambiguation/confirmation module to the control flow logic for continued execution.

2. The method of claim 1, wherein the control flow logic incorporates business process modeling (BPM).

3. The method of claim 1, wherein the disambiguation/confirmation requirement is generated by the control flow logic when a degree of certainty in a top candidate of the set of candidates is below a first predetermined threshold or a difference between the degree of certainty in the top candidate and another candidate of the set of candidates is below a second predetermined threshold.

4. The method of claim 1, wherein the steps of analyzing and sorting attributes includes collecting identifiers from each candidate of the set of candidates pertaining to each attribute and sorting the attributes according to linguistic or phonemic characteristics.

5. The method of claim 4, wherein a linguistic or phoneme database is accessed to provide the linguistic or phonemic characteristics.

6. The method of claim 1, wherein querying the user includes:
generating a disambiguation user interface based on the top-sorted attribute with reference to one or more user interface documents;
providing the generated disambiguation user interface to the user via a text-to-speech module;
obtaining a user response via an automatic speech recognition module; and
reducing the set of candidates based on the obtained user response.

7. The method of claim 1, wherein the partitioning score is a coefficient having a value of between 0.0 and 1.0.

8. A method for providing a voice application, comprising:
executing control flow logic modeling a dialog flow with a user via a voice browser, the control flow logic producing a disambiguation/confirmation requirement;
initiating a disambiguation/confirmation module in response to the disambiguation/confirmation requirement;
sending a candidate and selection criteria from the control flow logic to the disambiguation/confirmation module;
analyzing attributes of the candidate to determine a confirmation score for each attribute indicative of that attribute's ability to confirm the correctness of the candidate based on the selection criteria;
sorting the attributes based on their corresponding partitioning scores;
querying the user based on a top-sorted attribute and using results of the query to modify a measure of certainty in the correctness of the candidate; and
returning the measure of certainty in the correctness of the candidate to the control flow logic for continued execution.

9. The method of claim 8, wherein the steps of analyzing, sorting, and querying are repeated until the measure of certainty is either above a first predetermined threshold or below a second predetermined threshold.

10. The method of claim 9, wherein when the candidate is modified to be below the second predetermined level of certainty, additional candidates are received from the control flow logic and disambiguation is performed on the additional candidates.

11. The method of claim 8, wherein the control flow logic incorporates business process modeling (BPM).

12. The method of claim 8, wherein the disambiguation/confirmation requirement is generated by the control flow logic when the measure of certainty in the candidate is below a predetermined threshold.

13. The method of claim 8, wherein the steps of analyzing and sorting attributes includes collecting identifiers from the candidate pertaining to each attribute and sorting the attributes according to linguistic or phonemic characteristics.

14. The method of claim 13, wherein a linguistic or phoneme database is accessed to provide the linguistic or phonemic characteristics.

15. The method of claim 8, wherein querying the user includes:
generating a confirmation user interface based on the top-sorted attribute with reference to one or more user interface documents;
providing the generated confirmation user interface to the user via a text-to-speech module;
obtaining a user response via an automatic speech recognition module; and
modifying the measure of certainty based on the obtained user response.

16. A method for providing a voice application, comprising:
executing control flow logic modeling a dialog flow with a user via a voice browser, the control flow logic producing a disambiguation/confirmation requirement;
initiating a database disambiguation module in response to the disambiguation/confirmation requirement;
sending a set of at least two candidates and partitioning criteria from the control flow logic to the database disambiguation module;
retrieving a set of attributes for each candidate of the set from a database;
analyzing the attributes of each candidate of the set of candidates to determine a partitioning score for each attribute indicative of that attribute's ability to distinguish between the at least two candidates based on the partitioning criteria;
sorting the attributes based on their corresponding partitioning scores;
querying the user based on a top-sorted attribute and using results of the query to at least reduce the set of candidates;
repeating the steps of analyzing, sorting, and querying until the set of candidates is reduced to a single candidate; and
returning the single candidate from the database disambiguation module to the control flow logic for continued execution.

17. The method of claim 16, wherein the control flow logic incorporates business process modeling (BPM).

18. The method of claim 16, wherein the disambiguation/confirmation requirement is generated by the control flow logic when a degree of certainty in a top candidate of the set of candidates is below a first predetermined threshold or a difference between the degree of certainty in the top candidate and another candidate of the set of candidates is below a second predetermined threshold.

19. The method of claim 16, wherein the steps of analyzing and sorting attributes includes collecting identifiers from each candidate of the set of candidates pertaining to each attribute and sorting the attributes according to linguistic or phonemic characteristics.

20. The method of claim 16, wherein querying the user includes:
generating a disambiguation user interface based on the top-sorted attribute with reference to one or more user interface documents;
providing the generated disambiguation user interface to the user via a text-to-speech module;
obtaining a user response via an automatic speech recognition module; and
reducing the set of candidates based on the obtained user response.

* * * * *